MONITORING DEVICE FOR A SPINNING FRAME

Original Filed April 18, 1967 2 Sheets-Sheet 1

INVENTORS
MORRIS M. BRYAN, JR.
MORRIS W. ROBERTS
BY Newton, Hopkins
Jones & Ormsby
ATTORNEYS

MONITORING DEVICE FOR A SPINNING FRAME

Original Filed April 18, 1967 2 Sheets-Sheet 2

INVENTORS
MORRIS M. BRYAN, JR.
MORRIS W. ROBERTS
BY Newton, Hopkins, Jones & Ormsby
ATTORNEYS United States Patent Office Re. 27,501
Reissued Oct. 10, 1972

27,501

MONITORING DEVICE FOR A SPINNING FRAME

Morris M. Bryan, Jr., Jefferson, and Morris W. Roberts, Atlanta, Ga., assignors to Parks-Cramer Company Original No. 3,430,426, dated Mar. 4, 1969, Ser. No. 631,790, Apr. 18, 1967. Application for reissue Nov. 30, 1970, Ser. No. 93,923
Int. Cl. D01h *13/16, 13/26, 13/32*
U.S. Cl. 57—34 14 Claims

Matter enclosed in heavy brackets [ ] appears in the original patent but forms no part of this reissue specification; matter printed in italics indicates the additions made by reissue.

ABSTRACT OF THE DISCLOSURE

What is disclosed herein is a spinning frame which includes a monitoring means for monitoring the operating condition of each spindle assembly so as to provide an electrical output corresponding to the operating condition of each spindle assembly. The spinning frame is conventional in that yarn defines a substantially conical zone of motion as it passes to the rotating traveler of each spindle assembly and in one embodiment of the invention light reflected from yarn in a conical zone of motion is used to provide the electrical output corresponding to the operating condition of a spindle assembly. In another embodiment of the invention, the operation of a switch means in response to tension of yarn as it passes into a conical zone of motion is used to provide the electrical output corresponding to the operating condition of a spindle assembly. With either embodiment, the electrical outputs may be used to indicate that a spindle assembly is inoperative and may be accumulated by an accumulating means such as a conventional computer to indicate a pattern of operating difficulties indicative of a spindle assembly requiring corrective maintenance.

BACKGROUND OF INVENTION

Field of invention

This invention relates to textile machinery and more particularly to a spinning frame having improved operating efficiency and reliability because of the ease with which yarn breakage is identified for continuing operation at maximum efficiency and for the application of corrective maintenance procedures.

Prior art

Spinning frames in which roving yarn is drafted and twisted into thread while being transferred from one bobbin to another are well known in the textile manufacturing art. A basic feature of these spinning frames is the ability to spin a plurality of threads simultaneously and wind each thread on a separate bobbin. It is because of this multiple spinning feature that these spinning frames are regarded in the textile industry as being generally efficient and reliable.

However, the efficiency and reliability of these prior art spinning frames is dependent upon the prompt detection of broken yarn ends and prompt application of corrective maintenance procedures to insure both that yarn is being spun at all times and that the spindle assemblies carrying the bobbins are continuously operating. This is because broken yarn ends cause the particular bobbin upon which the yarn is being spun to become unproductive and because failure to promptly apply corrective maintenance procedures to a spindle assembly results in repeated failure of the spindle assembly.

With prior art spinning frames, breakage of the yarn being wound on a bobbin was detected by the operator as he walked up and down the sides of the spinning frame performing other assigned tasks. When he noted that one of the yarns had become broken so as to prevent the spinning thereof upon a bobbin carried by the spinning frame, he repaired this broken yarn and continued on his tasks. This process of detection of broken yarn ends was not only slow, but the irregularity with which the operator checked the bobbins for broken yarn ends frequently resulted in surveillance of each of the bobbins only after extended periods of time. Therefore, when a yarn became broken, it was usually an extended period of time before the broken end was detected and repaired so that the overall production efficiency of the spinning frame was reduced.

Moreover, since the operator simply repaired the broken yarn ends without noting the frequency with which a yarn end was broken on a particular spindle assembly, there was no way to obtain an indication that a particular spindle assembly was in need of corrective maintenance procedures unless a complete breakdown occurred. This also resulted in reducing the overall operating efficiency of the spinning frame as well as increasing the maintenance cost thereof.

SUMMARY OF INVENTION

The invention disclosed herein overcomes these and other difficulties associated with the prior art spinning frames in that it provides a spinning frame which periodically and automatically surveys each of the plurality of spindle assemblies to detect whether any yarn being spun on the bobbins is broken and which provides an electrical output when a yarn is broken. This feature of the spinning frame frees the operator for other activities and serves to increase the overall operating efficiency of the spinning frame since each bobbin is surveyed at relatively short intervals of time and may be repaired with a minimum of down time. Moreover, since the frequency of yarn end breaks on each spindle assembly is readily provided by selectively accumulating electrical outputs over an interval of time, corrective maintenance procedures may be applied to the particular spindle assembly before a complete breakdown occurs.

These improvements in the spinning frame are provided by a spinning frame having integral monitoring means for monitoring the operating conditions of each of the spindle assemblies and for providing an electrical output related to the operating condition of each of the spindle assemblies. The resulting plurality of electrical outputs are fed to a conventional circuit arrangement such as that provided by a computer to permit the yarn breakage of any particular bobbin to be indicated at a central station so that a broken yarn end may be quickly and easily repaired. Moreover, when a conventional circuit arrangement such as a computer is arranged as an accumulating means for accumulating the electrical outputs from the monitoring means, the invention includes an accumulating means which indicates when corrective maintenance procedures must be applied to a spindle assembly by indicating the frequency of the yarn end breaks associated with the spindle assembly.

These and other features and advantages of the invention may be more clearly understood upon consideration of the following detailed description and accompanying drawings wherein like characters of reference designate corresponding parts throughout.

These figures and the following detailed description disclose embodiments of the invention, however, the invention is not limited thereto since it may be embodied in other equivalent forms.

ILLUSTRATIVE EMBODIMENTS

Figure 1:
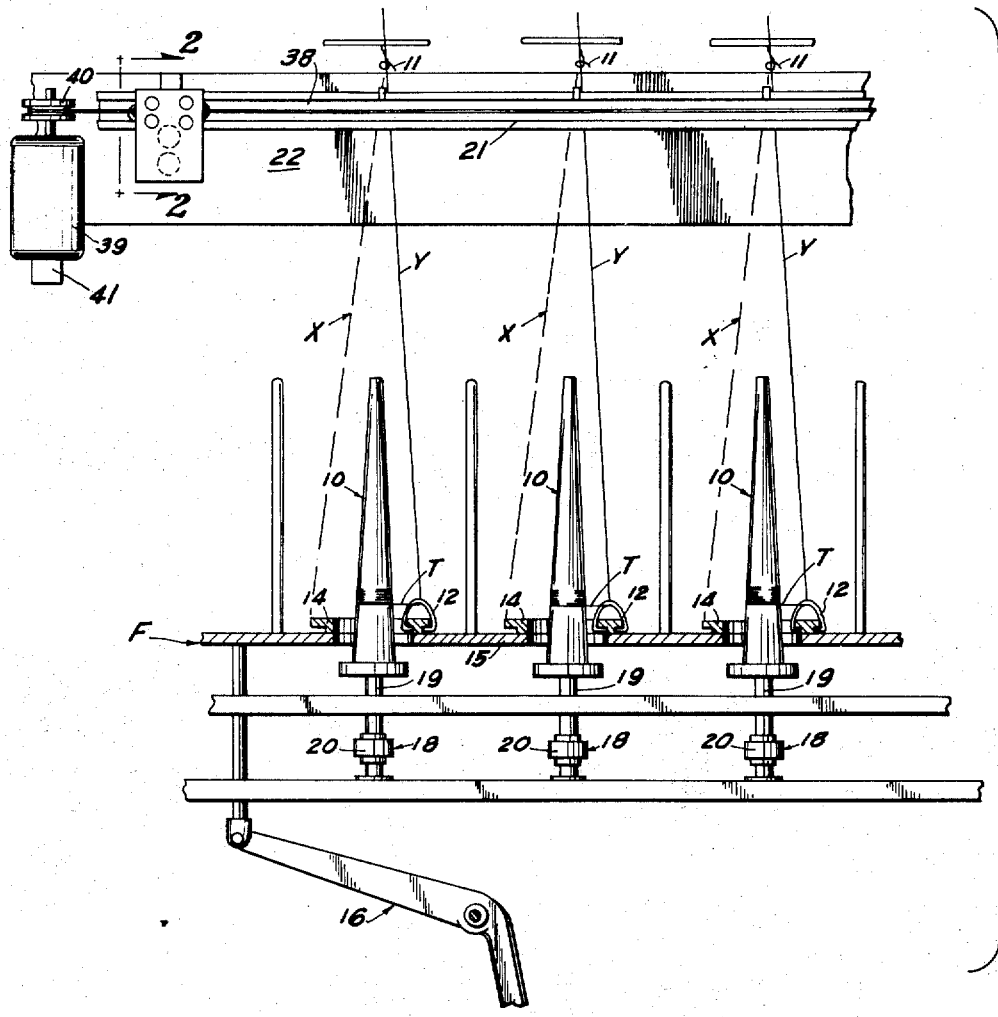
FIG. 1 is a partial front elevational view of a spinning frame illustrating one embodiment of the invention.

Referring to FIG. 1 it will be seen that the invention is used in conjunction with a conventional spinning frame F which utilizes ring travelers 12 to spin yarn Y into thread T and wind thread T upon each of the bobbins 10. In the particular spinning frame F shown, it will be understood that yarn Y is received from drafting rolls (not shown) and passes through pigtail guides 11 and thence through the travelers 12 which move around horizontally positioned spinning rings 14 mounted on a vertically movable ring support 15. The ring support 15 is selectively movable up and down with respect to the bobbins 10 by an elevating assembly 16 so that thread T wound on the bobbins 10 can be evenly distributed between the bottom and the top of the bobbins 10. A spindle assembly 18 mounts each bobbin 10 so that the bobbin 10 is rotated by a belt 20 driven from a common drive shaft (not shown).

As will be well understood by those skilled in the art, yarn Y passes through the pigtail guides 11 and the travelers 12 while being twisted and spun into thread and wound onto the bobbins 10 by rotation of the bobbins. During its travel from each pigtail guide 11 to a corresponding travelers 12, the yarn Y circumscribes a substantially conical zone of motion X due to the revolving motion of the traveler 12 about the ring 14.

Figure 2:
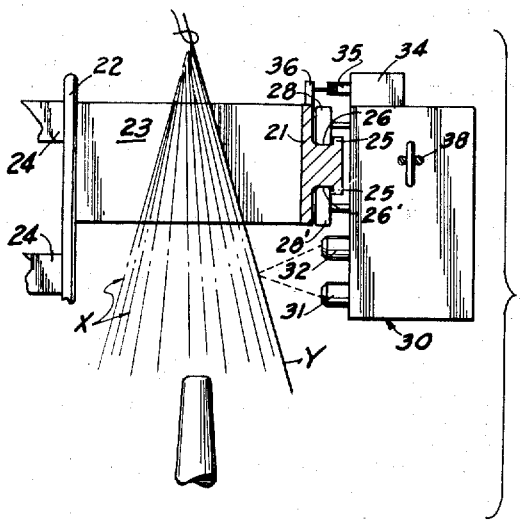
FIG. 2 is a cross-sectional view of that embodiment of the invention illustrated in FIG. 1 taken in line 2—2 of FIG. 1.

A first embodiment of the invention is shown in FIGS. 1 and 2 and includes a stationary track 21 fixedly mounted by supports 23 to a background board 22 carried by the frame of the spinning frame F through supports 24. The track 21, a cross-section of which is shown in FIG. 2, is positioned in front of the yarn Y by supports 23 extending from the background board 22 between spindle assemblies 18 so as not to interfere with the movement of the yarn Y from the pigtail guides 11 to the travelers 12 of the spindle assemblies 18. The track 21 is a substantially T-shaped member with flanges 25 at the base thereof to form runways 26 and 26'. These runways receive guide rolls 28 and 28' respectively, for guiding and supporting a monitoring means such as a monitoring mechanism 30 as it is moved along the track 21.

The monitoring mechanism 30 is positioned or passes in front of the yarn Y in each conical zone of motion X and includes a conventional photoelectric transmitter 31 and a conventional photoelectric receiver 32 extending below the track 21. Both the transmitter 31 and the receiver 32 are focused on the zone of motion X being defined by motion of yarn Y as it passes from a pigtail guide 11 to a traveler 12.

In operation of the monitoring mechanism 30, light is emitted from the transmitter 31 and reflected back to the receiver 32 by the yarn Y as the monitoring mechanism 30 moves past each spindle assembly 18. The light reflected from the yarn Y to the receiver 32 when the yarn Y is moving in a cone of motion X is sufficient to cause an electrical output to be generated. In the absence of yarn Y moving in a cone of motion X as when the yarn Y is broken, the light reflected from the yarn Y is not sufficient to cause an electrical output to be generated.

The monitoring mechanism 30 is moved progressively along track 21 with a cable 38 attached to the monitoring mechanism 30 and to a pulley 40 driven by a motor 39. Carried by the monitoring mechanism 30 is a microswitch 34 having an actuator arm 35 extending outwardly to engage a switch actuator 36 mounted on the track 21 at each spindle assembly 18. The switch 34 is operatively connected to the motor 39 so that when the switch 34 is activated at each station, the monitoring mechanism 30 will be stopped for a short period of time to allow the monitoring mechanism 30 to scan the cone of motion X defined by yarn Y. The background board 22 is preferably a black body so that it reflects very little light. This prevents inadvertent activation of the receiver 32 by light reflected from the background board 22.

Figure 5:
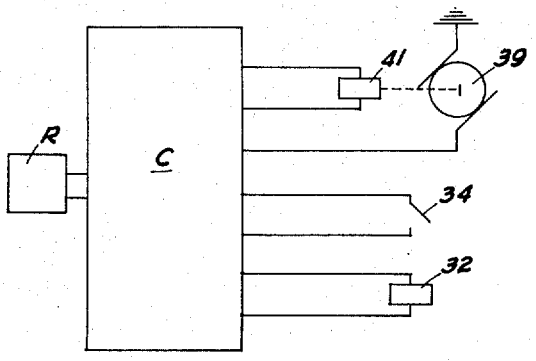
FIG. 5 is a schematic wiring diagram for a conventional computer which may be used with that embodiment of the invention shown in FIGS. 1 and 2.

Referring more particularly to FIG. 5, one circuit arrangement for this embodiment of the invention is shown. From FIG. 5, it will be seen that the motor 39 is driven through an output signal from a conventional computer C which is programmed so that the motor 39 may be selectively operated in response to actuation of the switch 34 through the switch actuators 36. A counter 41 is mechanically connected to the motor 39 and in response to revolutions of the motor 39 provides a signature output to the computer C that is representative of the position along the track 21 at which the monitoring mechanism 30 is located at any particular instance. This allows the computer C to distinguish the particular spindle assembly 18 on the spinning frame F at which light is being reflected into the receiver 32.

Moreover, it will be understood that the signature output from the counter 41 may also be used with the computer C in place of the switches 34 to stop the monitoring mechanism 30 at each spindle assembly 18 for a short period of time. This is because the computer C provides a convenient circuit for starting and stopping the motor 39 when the computer C is programmed in conventional manner. In addition, it will be understood that the monitoring mechanism 30 may be moved continuously past the plurality of spindle stations 18 rather than stopped at each spindle station 18 and still be responsive to light reflected into the receiver 32 at each spindle station 18. Regardless of the manner in which the monitoring mechanism 30 is positioned along the track 21, output of the receiver 32 at each spindle assembly 18 is fed to the computer C as a condition output which indicates whether a yarn Y is being spun onto a bobbin 10 at a particular spindle assembly 18.

A computer C has been chosen to illustrate a circuit arrangement because, as will be understood by those skilled in the art, a computer C inherently provides a convenient means for providing control signals and for receiving and accumulating a plurality of electrical outputs. It also provides a convenient means for providing an appropriate impulse to a read-out device R which identifies the operating condition at each spindle assembly by a visual signal and which provides an accumulative record of the performance of each particular spindle assembly 18. The readout device R may be any conventional device of its type and serves to tell an operator whether any yarn Y is broken and when a predetermined number of yarn breakages have occurred at a particular spindle assembly 18 so that corrective maintenance procedures may be applied to the spindle assembly 18 to correct any mechanical malfunction that may be present therein.

Figure 3:
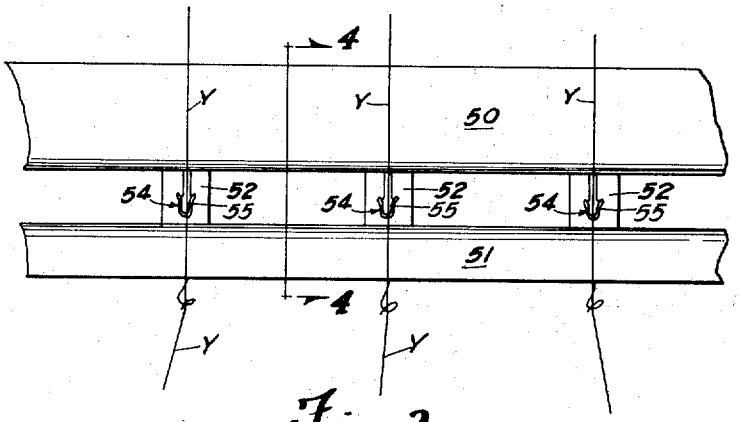
FIG. 3 is a front elevational view of a second embodiment of the invention.
Figure 4:
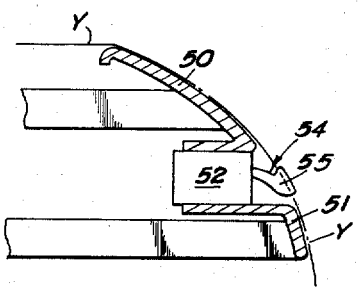
FIG. 4 is a cross-sectional view of the second embodiment of the invention illustrated in FIG. 3 taken in line 4—4 of FIG. 3.

Referring to FIGS. 3 and 4, it will be seen that a second embodiment of the invention comprises a first slide plate 50 and a second slide plate 51 positioned below the first slide plate 50. The slide plates 50 and 51 provide a smooth continuous surface over which the yarn Y passes as it moves from the drafting rolls (not shown) to the pigtail guides 11 on the spinning frame F.

Figure 6:
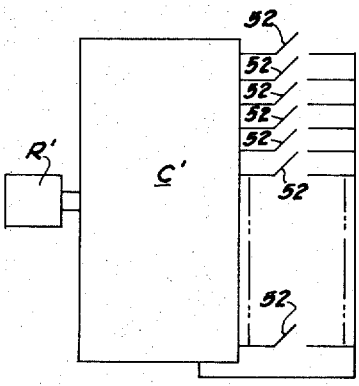
FIG. 6 is a schematic wiring diagram for a conventional computer which may be used with that embodiment of the invention shown in FIGS. 3 and 4.

A microswitch 52 is positioned between the upper guide 50 and the lower guide 51 corresponding with each spinning position on the frame F and has a smooth-surfaced actuator arm 54 with guide flanges 55 thereon for directing the yarn Y thereover as it moves over the slide plates 50 and 51. The actuator arm 54 is responsive to the yarn tension and as long as the yarn Y is being passed over the slide plates 50 and 51 under tension, the contacts of the microswitch 52 will be open so that so signal is provided to a computer C′ or other circuit means for providing an accumulating means in cooperation with a readout device R′ as seen in FIG. 6. However, when a yarn Y is broken and yarn tension is released, the contacts of a microswitch 52 are closed and an electrical output is provided to the computer C′. It will be understood that with appropriate arrangement and programming of the computer C′ in conventional manner, this electrical output serves as both a signature output which is characteristic of a particular spindle assembly 18 and a condition output which is indicative of the condition of yarn Y at the spindle assembly 18.

As with the readout device R in the first embodiment described above, the readout device R′ serves to visibly indicate when a particular yarn Y is broken as well as to indicate the accumulated yarn breakages at each spindle assembly 18. As a result, a broken yarn Y can be quickly repaired and after a predetermined accumulated number of broken yarn ends occur with respect to a particular spindle assembly 18, proper corrective maintenance procedures may be applied to the spindle assembly 18 to correct any mechanical malfunction that may be present.

OPERATION

In the operation of the first embodiment of the invention, yarn Y is secured to each bobbin 10 after passing through a guide 11 and a traveler 12 and the spinning operation is started. The computer C serves as a control circuit to activate the motor 39 to move the monitoring mechanism 30 along the track 21 and may be programmed to move and stop the monitoring mechanism 30 in response to the output of the counter 41. However, in the embodiment of the invention described above and which is arranged to stop the monitoring mechanism 30 at each spindle station 18, the actuator arm 35 of the switch 34 engages the actuator 36 at the first station of the spinning frame F and a holding signal is sent to the computer C.

This causes the computer C to stop the motor 39 for a predetermined period of time while the monitoring mechanism 30 scans the cone of motion X by emitting light from the transmitter 31 and receiving light reflected by yarn Y with the receiver 32. The computer C utilizes the output signal from the counter 41 as a signature output to indicate at which particular spindle assembly 18 yarn Y is being scanned and combines this with the condition output from the receiver 32 to provide an output to the read-out device R indicative of whether the yarn Y at the particular spindle assembly 18 is broken.

After stopping the movement of the monitoring mechanism 30 for a predetermined period of time, the computer C then causes the motor 39 to move the mechanism 30 to the next spindle assembly 18 whereupon the switch 34 causes the motor 39 to again stop the movement of the monitoring mechanism 30. The scanning operation is again performed by the monitoring mechanism 30 and the operation is repeated until the yarn Y at all spindle assemblies 18 has been scanned by motion of the monitoring mechanism 30 along the track 21. After the yarn Y at all of the spindle assemblies 18 has been scanned, the computer C causes the motor 39 to reverse and return the monitoring mechanism 30 to its starting position to immediately repeat the scanning operation. As already indicated above, this scanning operation may involve the stopping of the monitoring mechanism 30 at each spindle station 18 as described or may simply involve moving the monitoring mechanism 30 continuously along the track 21.

The computer C and readout device R are arranged to make an accumulative record of the yarn breaks at each spindle assembly 18 so that reference to this record will indicate when the particular spindle assembly 18, as evidenced by the number of yarn breaks, is in need of corrective maintenance procedures. The readout device R may be appropriately constructed to emit an audible or visual signal when a predetermined number of yarn breaks has occurred at a particular spindle assembly 18.

In the operation of the second embodiment of the invention, it will be seen that the spinning operation is started in the same manner as with the first embodiment of the invention. The computer C′ is programmed to either intermittently or constantly interrogate the spindle assemblies 18 through the micro-switches 52 and to provide an output to the readout device R′ similar to that provided by the computer C.

It will be obvious to those skilled in the art that many variations may be made in the embodiments chosen for the purpose of illustrating the invention without departing from the scope thereof as defined by the appended claims.

We claim:

1. Yarn twisting apparatus comprising a series of spaced spindle assemblies each constructed to receive a bobbin, a spinning frame including a series of spaced spinning rings, each spinning ring positioned so as to surround the bobbin received on a spindle assembly, a traveler connected to each spinning ring and arranged to pass freely about its spinning ring, frame moving means for reciprocating said spinning frame in a vertical direction, a series of yarn supply means each constructed to feed yarn at a predetermined rate to a bobbin from a position disposed above a spindle assembly through the traveler of the spindle assembly and to the bobbin received on the spindle assembly, means for rotating each of said spindle assemblies at a predetermined angular velocity whereby the travelers are each moved about their respective spinning ring and move the yarn in a varying spiral path about a bobbin which path is continually shortened and lengthened by the reciprocation of said spinning frame to form a series of conical zones of motion above each spindle assembly, a background board positioned on one side of the series of conical zones of motion, a series of support means extending from said background board between the conical zones of motion, a track member supported by said series of support means on the other side of the series of conical zones of motion, sensing means movable along said track member for detecting the movement of yarn in each of said conical zones of motion and generating an electrical output in response to the absence of yarn movement in any of the conical zones of motion, and accumulating means for separately accumulating the electrical outputs from said sensing means.

2. The invention of claim 1 wherein said sensing means comprises a light emitter directed toward said background board and positioned to illuminate the conical zones of motion, and light receiving means also directed toward said background board and positioned to receive light reflected by the yarn in the conical zones from said light emitter.

*3. Apparatus for identifying particular spindle assemblies of a textile yarn forming machine needing corrective maintenance, wherein the spindle assemblies are arranged in a series for normally forming a corresponding series of yarns, the apparatus comprising means for monitoring breakage of the yarns at the spindle assemblies, and means operatively connected with and responsive to the position of said monitoring means for identifiably distinguishing individual spindle assemblies as the same are monitored and for identifiably accumulating by particular spindle assemblies occurrences of yarn breakage over an interval of time whereby particular spindle assemblies having frequent yarn breakages may be identified for application of corrective maintenance thereto.*

*4. Apparatus according to claim 3 wherein said means for monitoring breakage of the yarns includes electrical means for generating output signals in response to the operating condition of the yarns at the spindle assemblies.*

*5. Apparatus according to claim 3 wherein said means for monitoring breakage of the yarns includes electrical means for generating output signals identifying a particular spindle assembly and indicative of the absence of a yarn from the spindle assembly.*

*6. Apparatus according to claim 3 wherein said means for monitoring breakage of the yarns includes electrical means for generating output signals identifying a particular spindle assembly and indicative of the presence of a yarn at the spindle assembly.*

*7. Apparatus for identifying particular spindle assemblies of a textile yarn forming machine needing corrective maintenance, wherein the spindle assemblies are mounted in a predetermined spaced series for normally forming a corresponding series of yarns, the apparatus comprising monitoring means movable along the series of yarns for sequentially monitoring breakage of the yarns at the spindle assemblies, and means operatively connected with and responsive to the position of said monitoring means for identifiably distinguishing individual spindle assemblies as the same are monitored and for identifiably accumulating by particular spindle assemblies occurrences of yarn breakage over an interval of time whereby particular spindle assemblies having frequent yarn breakages may be identified for application of corrective maintenance thereto.*

*8. Apparatus for identifying particular spindle assemblies of a textile yarn forming machine needing corrective maintenance, wherein the spindle assemblies are arranged in a series for normally forming a corresponding series of yarns, the apparatus comprising means for monitoring breakage of the yarns at the spindle assemblies, means operatively connected with and responsive to the position of said monitoring means for identifiably distinguishing individual spindle assemblies as the same are monitored and for identifiably accumulating by particular spindle assemblies occurrences of yarn breakage over an interval of time, and means operatively connected and responsive to said accumulating means for signalling the occurrence at any particular spindle assembly of a predetermined plurality of yarn breakages to thereby identify any spindle assembly needing application of corrective maintenance.*

*9. A method of identifying particular spindle assemblies of a textile yarn forming machine needing corrective maintenance, wherein the spindle assemblies are arranged in a series for normally forming a corresponding series of yarns, the method comprising the steps of monitoring breakage of the yarns at the spindle assemblies in a predetermined manner independently of reliance on an operator while identifiably distinguishing the position of individual spindle assemblies as the same are monitored and while, in response to the monitoring and distinguishing, identifiably accumulating by particular spindle assemblies repeated occurrences of yarn breakage over an interval of time whereby particular spindle assemblies having frequent yarn breakages may be identified for application of corrective maintenance thereto.*

*10. A method according to claim 9 wherein the step of monitoring breakage of the yarns includes generating electrical output signals in response to the operating condition of the yarns at the spindle assemblies.*

*11. A method according to claim 9 wherein the step of monitoring breakage of the yarns includes generating electrical output signals identifying a particular spindle assembly and indicative of the presence of a yarn at the spindle assembly.*

*12. A method according to claim 9 wherein the step of monitoring breakage of the yarns includes generating electrical output signals identifying a particular spindle assembly and indicative of the absence of a yarn from the spindle assembly.*

*13. A method of identifying particular spindle assemblies of a textile yarn forming machine needing corrective maintenance, wherein the spindle assemblies are mounted in a predetermined spaced series for normally forming a corresponding series of yarns, the method comprising the steps of moving a monitoring mechanism along the series of yarns while sequentially monitoring breakage of the yarns at the spindle assemblies and while identifiably distinguishing the position of individual spindle assemblies as the same are monitored and while, in response to the monitoring and distinguishing, identifiably accumulating by particular spindle assemblies repeated occurrences of yarn breakage over an interval of time whereby particular spindle assemblies having frequent yarn breakages may be identified for application of corrective maintenance thereto.*

*14. A method of identifying particular spindle assemblies of a textile yarn forming machine needing corrective maintenance, wherein the spindle assemblies are arranged in a series for normally forming a corresponding series of yarns, the method comprising the steps of monitoring breakage of the yarns at the spindle assemblies in a predetermined manner independently of reliance on an operator while identifiably distinguishing the position of individual spindle assemblies as the same are monitored and while, in response to the monitoring and distinguishing, identifiably accumulating by particular spindle assemblies repeated occurrences of yarn breakage over an interval of time and while signalling the occurrence of a predetermined plurality of yarn breakages at any particular spindle assembly to thereby identify any spindle assembly needing application of corrective maintenance.*

References Cited

The following references, cited by the Examiner, are of record in the patented file of this patent or the original patent.

UNITED STATES PATENTS

| | | | |
|---|---|---|---|
| 2,876,615 | 3/1959 | Turner | 57—81 |
| 2,930,179 | 3/1960 | Bailey | 57—81 X |
| 2,930,180 | 3/1960 | Adams et al. | 57—81 |
| 3,010,273 | 11/1961 | Bailey | 57—81 |
| 3,043,991 | 7/1962 | Schneider et al. | 57—81 X |
| 3,059,238 | 10/1962 | Quinn | 346—34 |
| 3,091,756 | 5/1963 | Lowman | 346—34 |
| 3,099,829 | 7/1963 | Namenyi-Katz | 57—81 X |
| 3,158,852 | 11/1964 | Schacher | 57—81 X |
| 3,226,726 | 12/1965 | Adams et al. | 346—34 |
| 3,305,687 | 2/1967 | Vinzelberg et al. | 250—219 |
| 3,305,687 | 2/1967 | Vinzelberg et al. | 250—219 S |
| 3,417,916 | 12/1968 | Brockel et al. | 139—1 X |
| 2,207,715 | 7/1940 | Bumstead | 139—336 X |
| 2,790,602 | 4/1957 | Jeppson | 139—336 X |
| 3,437,799 | 4/1969 | Upshur et al. | 139—336 X |

WERNER H. SCHROEDER, Primary Examiner

U.S. Cl. X.R.

57—81; 250—219 R, 234; 346—34